(12) United States Patent
Botti et al.

(10) Patent No.: US 10,979,859 B2
(45) Date of Patent: Apr. 13, 2021

(54) ALLOCATION OF RESOURCES IN A NETWORKED COMPUTING ENVIRONMENT BASED ON PHYSICAL LOCATION MAPPING

(71) Applicant: International Business Machines Corporation, Armonk, NY (US)

(72) Inventors: Derek W. Botti, Holly Springs, NC (US); Leon H. Cash, Jr., Durham, NC (US); Robert E. Garza, Texas City, TX (US); Richard A. Locke, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 16/682,158

(22) Filed: Nov. 13, 2019

(65) Prior Publication Data
US 2020/0084585 A1    Mar. 12, 2020

Related U.S. Application Data

(63) Continuation of application No. 13/936,441, filed on Jul. 8, 2013, now Pat. No. 10,582,340.

(51) Int. Cl.
*G06F 15/16*    (2006.01)
*H04W 4/029*    (2018.01)
*H04L 12/24*    (2006.01)

(52) U.S. Cl.
CPC ......... *H04W 4/029* (2018.02); *H04L 41/0803* (2013.01)

(58) Field of Classification Search
CPC ..................................................... H04W 4/029
See application file for complete search history.

(56) References Cited

U.S. PATENT DOCUMENTS

| | | | |
|---|---|---|---|
| 6,768,901 | B1 | 7/2004 | Osborn et al. |
| 7,463,648 | B1 | 12/2008 | Eppstein et al. |
| 8,037,187 | B2 | 10/2011 | Dawson et al. |
| 8,244,559 | B2 | 8/2012 | Horvitz et al. |
| 8,341,269 | B2 | 12/2012 | Balani et al. |

(Continued)

OTHER PUBLICATIONS

Maitland, J., "Keeping Control Isn't Easy", Chapter 4: Cloud-Based Infrastructure, SearchCloudComputing.com, Publication Date: Oct. 2009, 17 pages.

(Continued)

*Primary Examiner* — Kevin T Bates
*Assistant Examiner* — Clarence D McCray
(74) *Attorney, Agent, or Firm* — William H. Hartwell; Maxine L. Barasch; Keohane & D'Alessandro, PLLC

(57) ABSTRACT

An approach for allocating information technology (IT) resources in a networked computing environment (e.g., a cloud computing environment) based on physical location mapping is provided. Specifically, an IT allocation system assigns resources to a specific cloud pool based on the physical location of the resources. By mapping a given physical location (e.g., a defined region of a grid defining a datacenter) to a specific pool, and by enabling the tracking of a resource to a location within the datacenter, the approach can automatically assign a resource to a cloud pool based upon its physical location. Thus, the IT allocation system provides additional pool elasticity while easing the management burden.

20 Claims, 9 Drawing Sheets

(56) References Cited

U.S. PATENT DOCUMENTS

| | | | |
|---|---|---|---|
| 8,352,611 | B2 | 1/2013 | Maddhuri et al. |
| 8,433,803 | B2 | 4/2013 | Madduri et al. |
| 9,069,482 | B1 | 6/2015 | Chopra et al. |
| 2005/0198641 | A1 | 9/2005 | Eilam et al. |
| 2006/0091207 | A1 | 5/2006 | Chang |
| 2006/0248372 | A1 | 11/2006 | Aggarwal et al. |
| 2008/0080396 | A1 | 4/2008 | Meijer et al. |
| 2009/0300210 | A1 | 12/2009 | Ferris |
| 2009/0300607 | A1 | 12/2009 | Ferris et al. |
| 2010/0115222 | A1 | 5/2010 | Usami |
| 2010/0281151 | A1 | 11/2010 | Ramankutty et al. |
| 2011/0137805 | A1 | 6/2011 | Brookbanks et al. |
| 2011/0145657 | A1 | 6/2011 | Bishop et al. |
| 2011/0307523 | A1 | 12/2011 | Balani et al. |
| 2011/0320606 | A1 | 12/2011 | Madduri et al. |
| 2012/0005344 | A1* | 1/2012 | Kolin ............... H05K 7/20836 709/226 |
| 2012/0124046 | A1 | 5/2012 | Provenzano |
| 2012/0246425 | A1 | 9/2012 | Tanaka et al. |
| 2012/0254400 | A1 | 10/2012 | Iyengar et al. |
| 2013/0007735 | A1 | 1/2013 | Bookman et al. |
| 2013/0054780 | A1 | 2/2013 | Bade et al. |
| 2013/0117801 | A1 | 5/2013 | Shieh et al. |
| 2013/0225199 | A1 | 8/2013 | Shaw |
| 2013/0326546 | A1 | 12/2013 | Bavishi et al. |
| 2013/0339527 | A1 | 12/2013 | Chowdhry |
| 2014/0089510 | A1 | 3/2014 | Hao et al. |
| 2014/0351409 | A1 | 11/2014 | Basoglu et al. |
| 2015/0012657 | A1 | 1/2015 | Botti et al. |
| 2015/0081374 | A1 | 3/2015 | Sahlstrom et al. |
| 2015/0143064 | A1 | 5/2015 | Bhargava et al. |

OTHER PUBLICATIONS

Mell, P. et al., "The NIST Definition of Cloud Computing", National Institute of Standards and Technology, Information Technology Laboratory, Vers. 15, Oct. 7, 2009, 2 pages.

"Hyper-V Cloud Fast Track Program", Microsoft Technet, Feb. 2011, 48 pages. No authors cited.

McCray, Clarence D., U.S. Appl. No. 13/936,441, Office Action, dated Oct. 29, 2015, 23 pgs.

McCray, Clarence D., U.S. Appl. No. 13/936,441, Final Office Action, dated Jun. 30, 2016, 15 pgs.

McCray, Clarence D., U.S. Appl. No. 13/936,441, Office Action, dated Jan. 6, 2017, 14 pgs.

McCray, Clarence D., U.S. Appl. No. 13/936,441, Final Office Action, dated Jul. 19, 2017, 18 pgs.

McCray, Clarence D., U.S. Appl. No. 13/936,441, Office Action, dated Feb. 27, 2018, 21 pgs.

McCray, Clarence D., U.S. Appl. No. 13/936,441, Final Office Action, dated Oct. 19, 2018, 21 pgs.

McCray, Clarence D., U.S. Appl. No. 13/936,441, Office Action, dated Mar. 8, 2019, 21 pgs.

McCray, Clarence D., U.S. Appl. No. 13/936,441, Notice of Allowance, dated Sep. 23, 2019, 8 pgs.

\* cited by examiner

ALLOCATION OF RESOURCES IN A NETWORKED COMPUTING ENVIRONMENT BASED ON PHYSICAL LOCATION MAPPING

The present patent document is a continuation of U.S. patent application Ser. No. 13/936,441, filed Jul. 8, 2013, entitled "ALLOCATION OF RESOURCES INA NETWORKED COMPUTING ENVIRONMENT BASED ON PHYSICAL LOCATION MAPPING", the disclosure of which is incorporated herein by reference.

TECHNICAL FIELD

In general, embodiments of the present invention relate to information technology (IT) resource allocation. Specifically, embodiments of the present invention relate to an approach for allocating IT resources in a networked computing environment (e.g., a cloud computing environment) based on physical location mapping.

BACKGROUND

The networked computing environment (e.g., cloud computing environment) is an enhancement to the predecessor grid environment, whereby multiple grids and other computation resources may be further enhanced by one or more additional abstraction layers (e.g., a cloud layer), thus making disparate devices appear to an end-consumer as a single pool of seamless resources. These resources may include such things as physical or logical computing engines, servers and devices, device memory, and storage devices, among others.

Some cloud computing systems may utilize the idea of a pool as a fundamental organizational concept for the allocation and abstraction of physical resources. A pool serves as both the logical container to which a specific physical resource (e.g., a physical server) is assigned and the abstracted whole (cloud computing infrastructure?) from which logical or virtual slices are allocated to cloud service consumers. Existing solutions assign physical resources to specific pools and thereafter treat the assignments as relatively static. Moving a resource (e.g., a physical server) from one pool to another is often a relatively complicated procedure which must be performed carefully by a knowledgeable practitioner i.e., with some awareness of the internals of the allocation mechanism, lest the datastore used to track such assignments becomes out of sync with the actual (or perceived) allocation. However, existing solutions focus on dynamic allocations, i.e., the dividing up of the existing pool into logical slices assigned to specific users, and fail to adequately assign resources to a pool to increase the available capacity of the overall pool.

SUMMARY

In general, an approach for allocating IT resources in a networked computing environment (e.g., a cloud computing environment) based on physical location mapping is provided. Specifically, an IT allocation system assigns resources to a specific cloud pool based on the physical location of the resources. By mapping a given physical location (e.g., a defined region of a grid defining a datacenter) to a specific pool, and by enabling the tracking of a resource to a location within a datacenter, the approach can automatically assign a resource to a cloud pool based upon its physical location. The IT allocation system is configured to operate with existing wired technology, wherein the resource can be assigned to a pool based on location, but marked as unavailable until the resource is cabled and made available on the network, or configured to leverage wireless networking to provide an even more dynamic solution, whereby the movement of a resource from one point in the datacenter to another, without disconnecting from the network, can trigger the reassignment of the resource from one pool to another. As such, the IT allocation system provides additional pool elasticity while easing the management burden.

A first aspect of the present invention provides a method for allocating IT resources in a networked computing environment based on physical location mapping, the method comprising the computer-implemented steps of: tracking a movement of a resource from a first region to a second region of a datacenter; determining a physical location corresponding to the second region; mapping the second region to a pool of resources associated with the second region based on the physical location of the second region; and configuring the resource for use in the second region.

A second aspect of the present invention provides a system for allocating IT resources in a networked computing environment based on physical location mapping, comprising: a memory medium comprising instructions; a bus coupled to the memory medium; and a processor coupled to the bus that when executing the instructions causes the system to: track a movement of a resource from a first region to a second region of a datacenter; determine a physical location corresponding to the second region; map the second region to a pool of resources associated with the second region based on the physical location of the second region; and configure the resource for use in the second region.

A third aspect of the present invention provides a computer program product for allocating IT resources in a networked computing environment based on physical location mapping, the computer program product comprising a computer readable storage media, and program instructions stored on the computer readable storage media, to: track a movement of a resource from a first region to a second region of a datacenter; determine a physical location corresponding to the second region; map the second region to a pool of resources associated with the second region based on the physical location of the second region; and configure the resource for use in the second region.

BRIEF DESCRIPTION OF THE DRAWINGS

These and other features of this invention will be more readily understood from the following detailed description of the various aspects of the invention taken in conjunction with the accompanying drawings in which.

Figure 1:
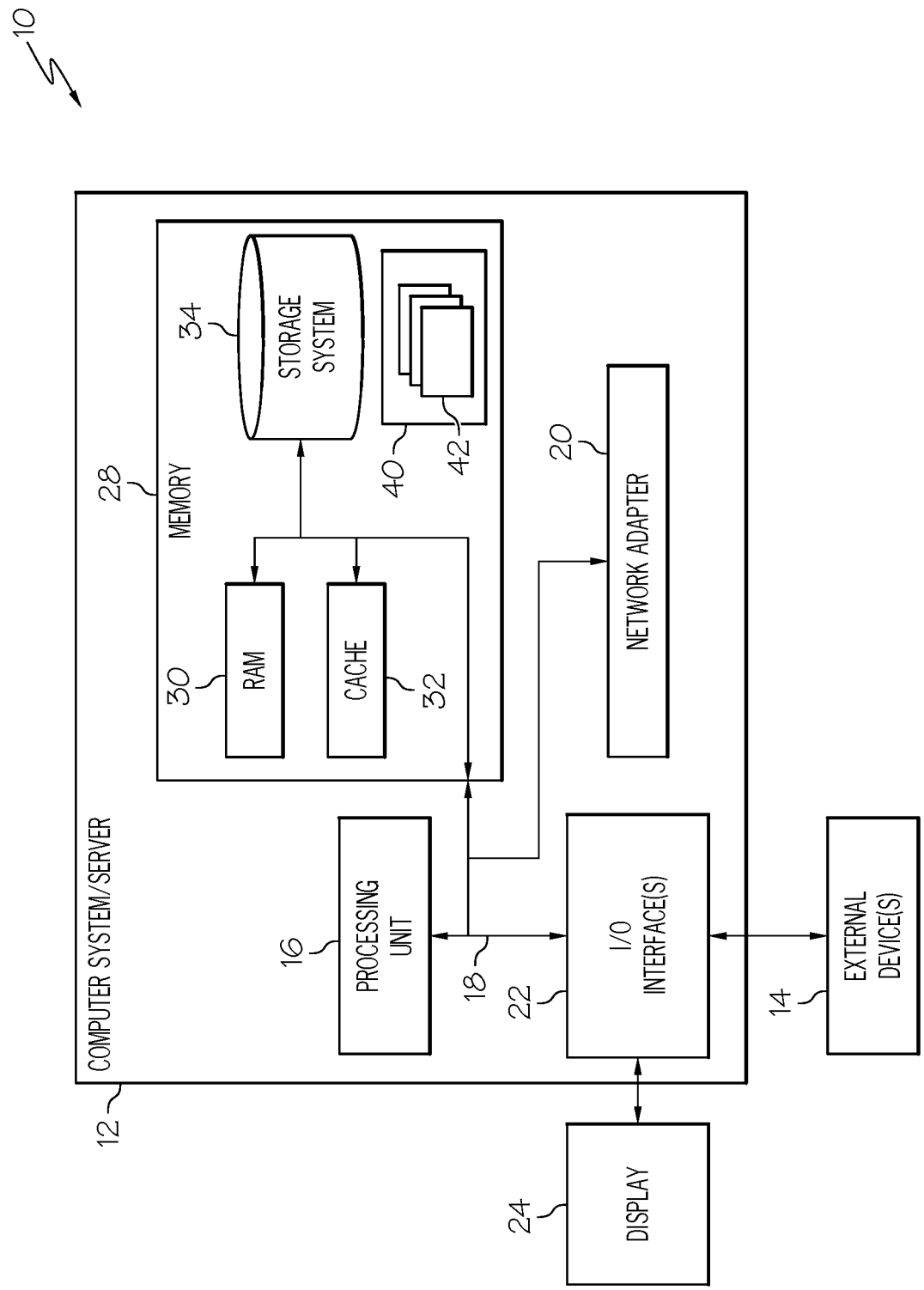
FIG. 1 depicts a cloud computing node according to an embodiment of the present invention.

The drawings are not necessarily to scale. The drawings are merely schematic representations, not intended to portray specific parameters of the invention. The drawings are intended to depict only typical embodiments of the invention, and therefore should not be considered as limiting the scope of the invention. In the drawings, like numbering represents like elements.

DETAILED DESCRIPTION

Illustrative embodiments will now be described more fully herein with reference to the accompanying drawings, in which embodiments are shown. This disclosure may, however, be embodied in many different forms and should not be construed as limited to the embodiments set forth herein. Rather, these embodiments are provided so that this disclosure will be thorough and complete and will fully convey the scope of this disclosure to those skilled in the art. In the description, details of well-known features and techniques may be omitted to avoid unnecessarily obscuring the presented embodiments.

The terminology used herein is for the purpose of describing particular embodiments only and is not intended to be limiting of this disclosure. As used herein, the singular forms "a", "an", and "the" are intended to include the plural forms as well, unless the context clearly indicates otherwise. Furthermore, the use of the terms "a", "an", etc., do not denote a limitation of quantity, but rather denote the presence of at least one of the referenced items. The term "set" is intended to mean a quantity of at least one. It will be further understood that the terms "comprises" and/or "comprising", or "includes" and/or "including", when used in this specification, specify the presence of stated features, regions, integers, steps, operations, elements, and/or components, but do not preclude the presence or addition of one or more other features, regions, integers, steps, operations, elements, components, and/or groups thereof.

Embodiments of the present invention provide an approach for allocating IT resources in a networked computing environment (e.g., a cloud computing environment) based on physical location mapping. Specifically, an IT allocation system assigns resources to a specific cloud pool based on the physical location of the resources. By mapping a given physical location (e.g., a defined region of a grid defining a datacenter) to a specific pool, and by enabling the tracking of a resource to a location within the datacenter, the approach can automatically assign a resource to a cloud pool based upon its physical location. The IT allocation system is configured to operate with existing wired technology, wherein the resource can be assigned to a pool based on location but marked as unavailable until the resource is cabled and made available on the network, or configured to leverage wireless networking to provide an even more dynamic solution, wherein the movement of a resource from one point in the datacenter to another, without disconnecting from the network, can trigger the reassignment of the resource from one pool to another. As such, the IT allocation system provides additional pool elasticity while easing the management burden.

It is understood in advance that although this disclosure includes a detailed description of cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows. On-demand self-service: a cloud consumer can unilaterally provision computing capabilities, such as server time and network storage, as needed, automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active consumer accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited consumer-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application-hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Referring now to FIG. 1, a schematic of an example of a cloud computing node is shown. Cloud computing node 10 is only one example of a suitable cloud computing node and is not intended to suggest any limitation as to the scope of use or functionality of embodiments of the invention described herein. Regardless, cloud computing node 10 is capable of being implemented and/or performing any of the functionality set forth hereinabove.

In cloud computing node 10, there is a computer system/server 12, which is operational with numerous other general purpose or special purpose computing system environments or configurations. Examples of well-known computing systems, environments, and/or configurations that may be suitable for use with computer system/server 12 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer system/server 12 may be described in the general context of computer system-executable instructions, such as program modules, being executed by a computer system. Generally, program modules may include routines, programs, objects, components, logic, data structures, and so on that perform particular tasks or implement particular abstract data types. Computer system/server 12 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 1, computer system/server 12 in cloud computing node 10 is shown in the form of a general-purpose computing device. The components of computer system/server 12 may include, but are not limited to, one or more processors or processing units 16, a system memory 28, and a bus 18 that couples various system components including system memory 28 to processor 16.

Bus 18 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12 typically includes a variety of computer system readable media. Such media may be any available media that is accessible by computer system/server 12, and it includes both volatile and non-volatile media, removable and non-removable media.

System memory 28 can include computer system readable media in the form of volatile memory, such as random access memory (RAM) 30 and/or cache memory 32. Computer system/server 12 may further include other removable/non-removable, volatile/non-volatile computer system storage media. By way of example only, storage system 34 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM, or other optical media can be provided. In such instances, each can be connected to bus 18 by one or more data media interfaces. As will be further depicted and described below, memory 28 may include at least one program product having a set (e.g., at least one) of program modules that are configured to carry out the functions of embodiments of the invention.

The embodiments of the invention may be implemented as a computer readable signal medium, which may include a propagated data signal with computer readable program code embodied therein (e.g., in baseband or as part of a carrier wave). Such a propagated signal may take any of a variety of forms including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium including, but not limited to, wireless, wireline, optical fiber cable, radio-frequency (RF), etc., or any suitable combination of the foregoing.

Program/utility 40, having a set (at least one) of program modules 42, may be stored in memory 28 by way of example, and not limitation, as well as an operating system, one or more application programs, other program modules, and program data. Each of the operating system, one or more application programs, other program modules, and program data or some combination thereof, may include an implementation of a networking environment. Program modules 42 generally carry out the functions and/or methodologies of embodiments of the invention as described herein.

Computer system/server 12 may also communicate with one or more external devices 14 such as a keyboard, a pointing device, a display 24, etc.; one or more devices that enable a consumer to interact with computer system/server 12; and/or any devices (e.g., network card, modem, etc.) that enable computer system/server 12 to communicate with one or more other computing devices. Such communication can occur via I/O interfaces 22. Still yet, computer system/server 12 can communicate with one or more networks such as a local area network (LAN), a general wide area network (WAN), and/or a public network (e.g., the Internet) via network adapter 20. As depicted, network adapter 20 communicates with the other components of computer system/server 12 via bus 18. It should be understood that although not shown, other hardware and/or software components could be used in conjunction with computer system/server 12. Examples include, but are not limited to: microcode, device drivers, redundant processing units, external disk drive arrays, RAID systems, tape drives, and data archival storage systems, etc.

Figure 2:
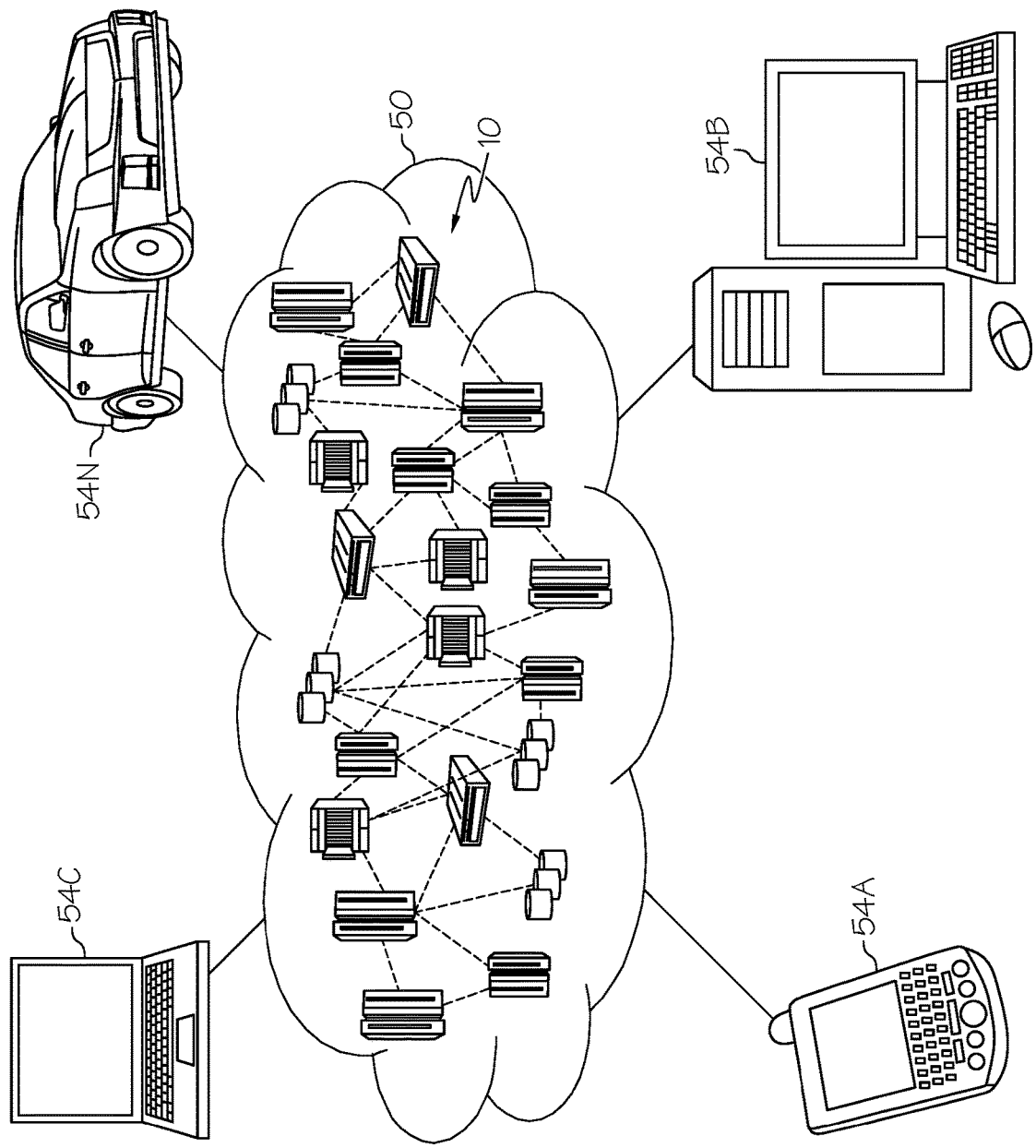
FIG. 2 depicts a cloud computing environment according to an embodiment of the present invention.

Referring now to FIG. 2, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as private, community, public, or hybrid clouds as described hereinabove, or a combination thereof. This allows cloud computing environment 50 to offer infrastructure, platforms, and/or software as services for which a cloud consumer does not need to maintain resources on a local computing device. It is understood that the types of computing devices 54A-N shown in FIG. 2 are intended to be illustrative only and that computing nodes 10 and cloud computing environment 50 can communicate with any type of computerized device over any type of network and/or network addressable connection (e.g., using a web browser).

Figure 3:
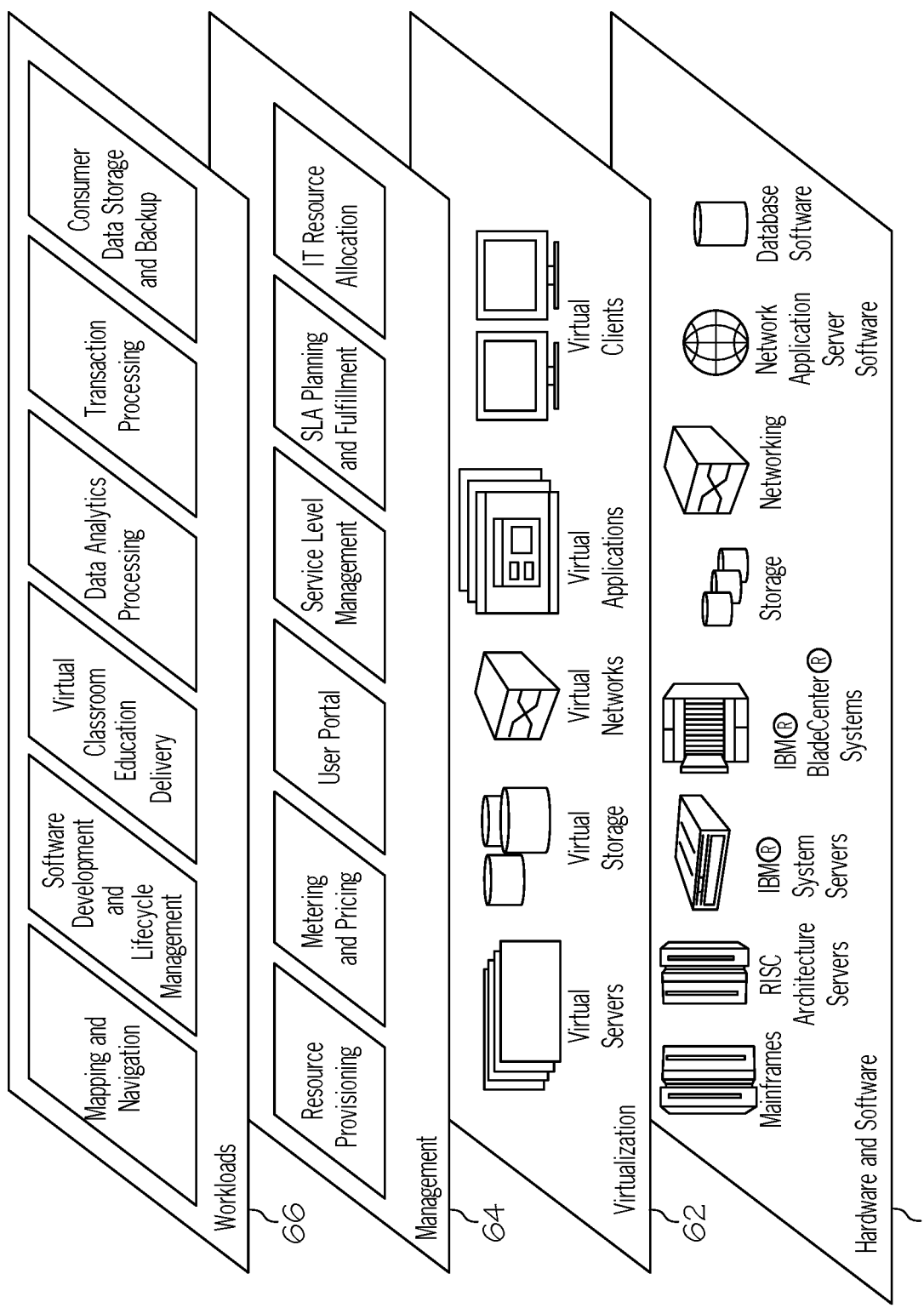
FIG. 3 depicts abstraction model layers according to an embodiment of the present invention.

Referring now to FIG. 3, a set of functional abstraction layers provided by cloud computing environment 50 (FIG. 2) is shown. It should be understood in advance that the components, layers, and functions shown in FIG. 3 are intended to be illustrative only and embodiments of the invention are not limited thereto. As depicted, the following layers and corresponding functions are provided:

Hardware and software layer 60 includes hardware and software components. Examples of hardware components include mainframes. In one example, IBM® zSeries® systems and RISC (Reduced Instruction Set Computer) architecture based servers. In one example, IBM pSeries® systems, IBM System x® servers, IBM BladeCenter® systems, storage devices, networks, and networking components. Examples of software components include network application server software. In one example, IBM WebSphere® application server software and database software. In one example, IBM DB2® database software. (IBM, zSeries, pSeries, System x, BladeCenter, WebSphere, and DB2 are trademarks of International Business Machines Corporation registered in many jurisdictions worldwide.)

Virtualization layer 62 provides an abstraction layer from which the following examples of virtual entities may be provided: virtual servers; virtual storage; virtual networks, including virtual private networks; virtual applications and operating systems; and virtual clients.

In one example, management layer 64 may provide the functions described below. Resource provisioning provides dynamic procurement of computing resources and other resources that are utilized to perform tasks within the cloud computing environment. Metering and pricing provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. Consumer portal provides access to the cloud computing environment for consumers and system administrators. Service level management provides cloud computing resource allocation and management such that required service levels are met. Service Level Agreement (SLA) planning and fulfillment provides pre-arrangement for, and procurement of, cloud computing resources for which a future requirement is anticipated in accordance with an SLA. Further shown in management layer is IT resource allocation, which represents the functionality that is provided under the embodiments of the present invention.

Workloads layer 66 provides examples of functionality for which the cloud computing environment may be utilized. Examples of workloads and functions which may be provided from this layer include: mapping and navigation; software development and lifecycle management; virtual classroom education delivery; data analytics processing; transaction processing; and consumer data storage and backup. As mentioned above, all of the foregoing examples described with respect to FIG. 3 are illustrative only, and the invention is not limited to these examples.

It is understood that all functions of the present invention as described herein typically may be performed by the command identification functionality (of management layer 64, which can be tangibly embodied as modules of program code 42 of program/utility 40 (FIG. 1). However, this need not be the case. Rather, the functionality recited herein could be carried out/implemented and/or enabled by any of the layers 60-66 shown in FIG. 3.

It is reiterated that although this disclosure includes a detailed description on cloud computing, implementation of the teachings recited herein are not limited to a cloud computing environment. Rather, the embodiments of the present invention are intended to be implemented with any type of networked computing environment now known or later developed.

Figure 4:
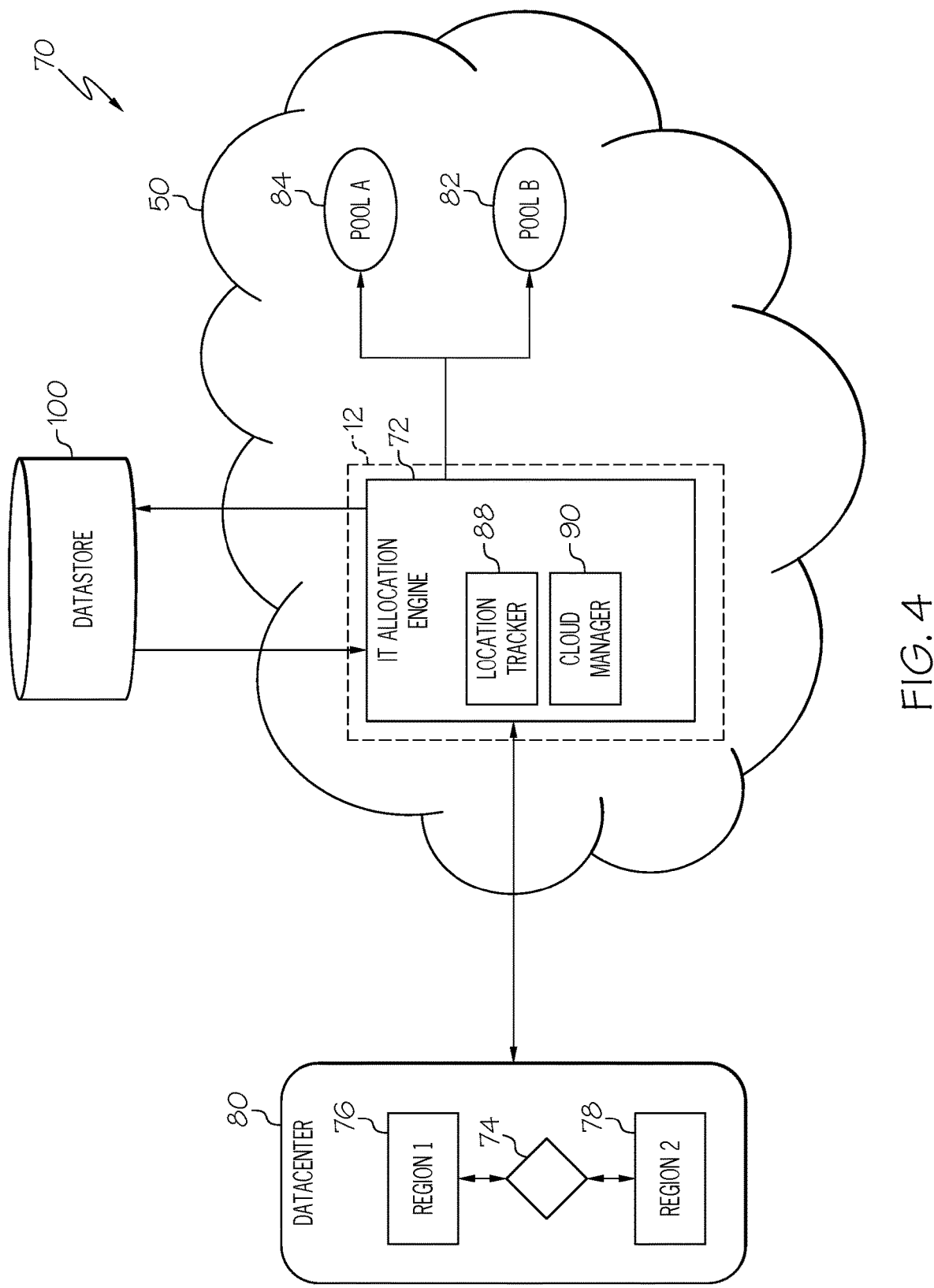
FIG. 4 depicts a system diagram according to an embodiment of the present invention.

Referring now to FIG. 4, a system diagram describing the functionality discussed herein according to an embodiment of the present invention is shown. It is understood that the teachings recited herein may be practiced within any type of networked computing environment 70 (e.g., a cloud computing environment 50). A stand-alone computer system/server 12 is shown in FIG. 4 for illustrative purposes only. In the event the teachings recited herein are practiced in a networked computing environment 70, each client need not have an IT allocation engine (hereinafter "system 72"). Rather, system 72 could be loaded on a server or server-capable device that communicates (e.g., wirelessly) with the clients to provide device protection therefor. Regardless, as depicted, system 72 is shown within computer system/server 12. In general, system 72 can be implemented as program/utility 40 on computer system 12 of FIG. 1 and can enable the functions recited herein. It is further understood that system 72 may be incorporated within or work in conjunction with any type of system that receives, processes and/or executes commands with respect to IT resources in a networked computing environment. Such other system(s) have not been shown in FIG. 4 for brevity purposes.

Along these lines, system 72 may perform multiple functions similar to a general-purpose computer. Specifically, among other functions, system 72 may: track a movement of a resource 74 from a first region 76 to a second region 78 within a datacenter 80; determine a physical location corresponding to second region 78; map second region 78 to a pool of resources 82 (i.e., pool B) associated with second region 78 based on the physical location of second region 78; and configure resource 74 for use in second region 78. In one embodiment, to determine the physical location corresponding to second region 78, system 72 is configured to perform either of: detect a position of resource 74 after resource 74 has been static for a predetermined period of time, or continuously detect the position of resource 74.

System 72 is further configured to enable connectivity between second region 78 and resource 74; detect the connectivity between second region 78 and resource 74; and assign a status identifier to resource 74 indicating an availability of resource 74. In one embodiment, to detect the connectivity, system 72 is configured to detect the presence of resource 74 on an internet protocol (IP) network (e.g., layer 60 shown in FIG. 3) in a fully configured state, receive a connectivity status from resource 74, and periodically check the connectivity status.

In another embodiment, system 72 is further configured to disconnect resource 74 from a pool of resources 84 (i.e., pool A) associated with first region 76 by assigning a status identifier to resource 74 indicating unavailability of resource 74, and migrating a set of cloud service instances from resource 74.

To accomplish this, system 72 comprises: a location tracker 88 configured to maintain an awareness of each resource's (e.g., resource 74) location within datacenter 80, which may be represented as either a 2-dimensional or 3-dimensional space, and map that location to a defined region (e.g., first region 76 or second region 78). System 72 further comprises a cloud manager 90 configured to manage the resource pools (e.g., pool A and pool B), each of which maps to one or more defined regions (e.g., first region 76 or second region 78) of datacenter 80.

Figure 5:
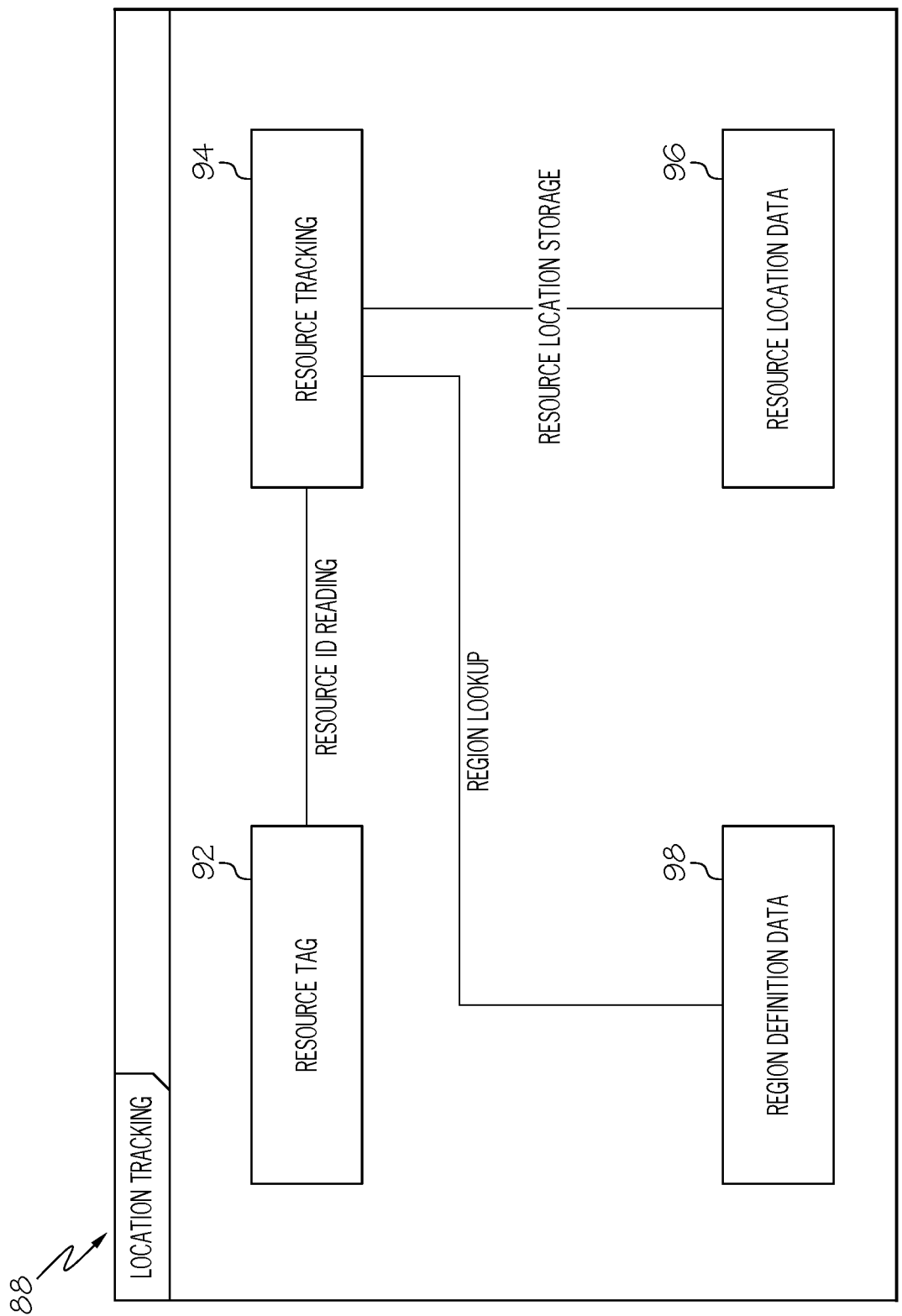
FIG. 5 depicts a system diagram according to an embodiment of the present invention.

As shown in more detail in FIG. 5, location tracker 88 comprises the following non-limiting list of components:
I. Resource Tag 92, which comprises a tag attached to or incorporated with each resource for transmitting (or allow to be read in a passive sensing system) the resource's unique identifier, which is a unique key within any database used for resource tracking;
II. Resource Tracking 94, which comprises a central component of location tracker 88 that tracks each unique resource within the managed physical space, measures its physical location, maps the location to a region, and stores this information for persistent availability. In an alternate embodiment, Resource Tracking 94 could simply store the physical location and do a region lookup for the resource upon request/at intervals or only if the physical location changed by a certain amount;
III. Resource Location Data 96, which operates with a datastore (e.g., datastore 100 in FIG. 4) containing the current location of each resource known to the system, tracked as to specific physical location and/or region; and
IV. RegionDefinitionData 98, which operates with datastore 100 containing the spatial representation of datacenter 80, subdivided into regions to which any physical location within datacenter 80 can be mapped based on the definition parameters.

Illustrative Examples

Referring now to FIGS. 4, 6, 7, and 8, a number of illustrative examples for allocating IT resources will be described in greater detail. In the various examples described below, the following details of system diagram (FIG. 4) will be understood.

First, physical resources are tracked in a persistent datastore 100, which is itself available to or variously part of cloud manager 90. Location tracker 88 detects resources automatically, i.e., it does not require an external trigger, such as actuation via a GUI to track the movement of a resource, beyond the actual movement itself. Datastore 100 is also available to the location tracker 88. Datastore 100 comprises both asset and configuration storage and contains, e.g., the size, type, and unique tracking ID of each resource. Location tracker 88 maintains within datastore 100 the region definitions and the specific location parameters defining the region boundaries. Regions are bounded by a border of configurable width. A default would be roughly equal to the greatest horizontal dimension (e.g., assuming the use of floor tiles or X and Y coordinates for region definition parameters) of a physical resource.

Location tracker 88 does not require that a resource be connected to a network or bus (e.g., an IP network or a storage backplane) to detect/track the resource's location. Instead, location tracker 88 can communicate with cloud manager 90 for the purpose of sending resource location update messages.

Furthermore, physical resources are housed within datacenter 80, which is logically divided into regions. Each region may be defined by, e.g., a specific set of floor tiles or X, Y, and possibly Z coordinates. Location tracker 88 can detect the physical location of resources within datacenter 80 with a granularity sufficient to detect the placement of a physical resource within a region. In one embodiment, RFID tags and readers are employed.

Still furthermore, cloud manager 90 maintains a stateful persistent mapping between regions and resource pools. A region can map to no more than one pool (it may map to zero pools), but a pool may map to more than one region (a pool may also map to zero regions, which would result in no resources being assigned to it under some embodiments of this invention).

Figure 6:
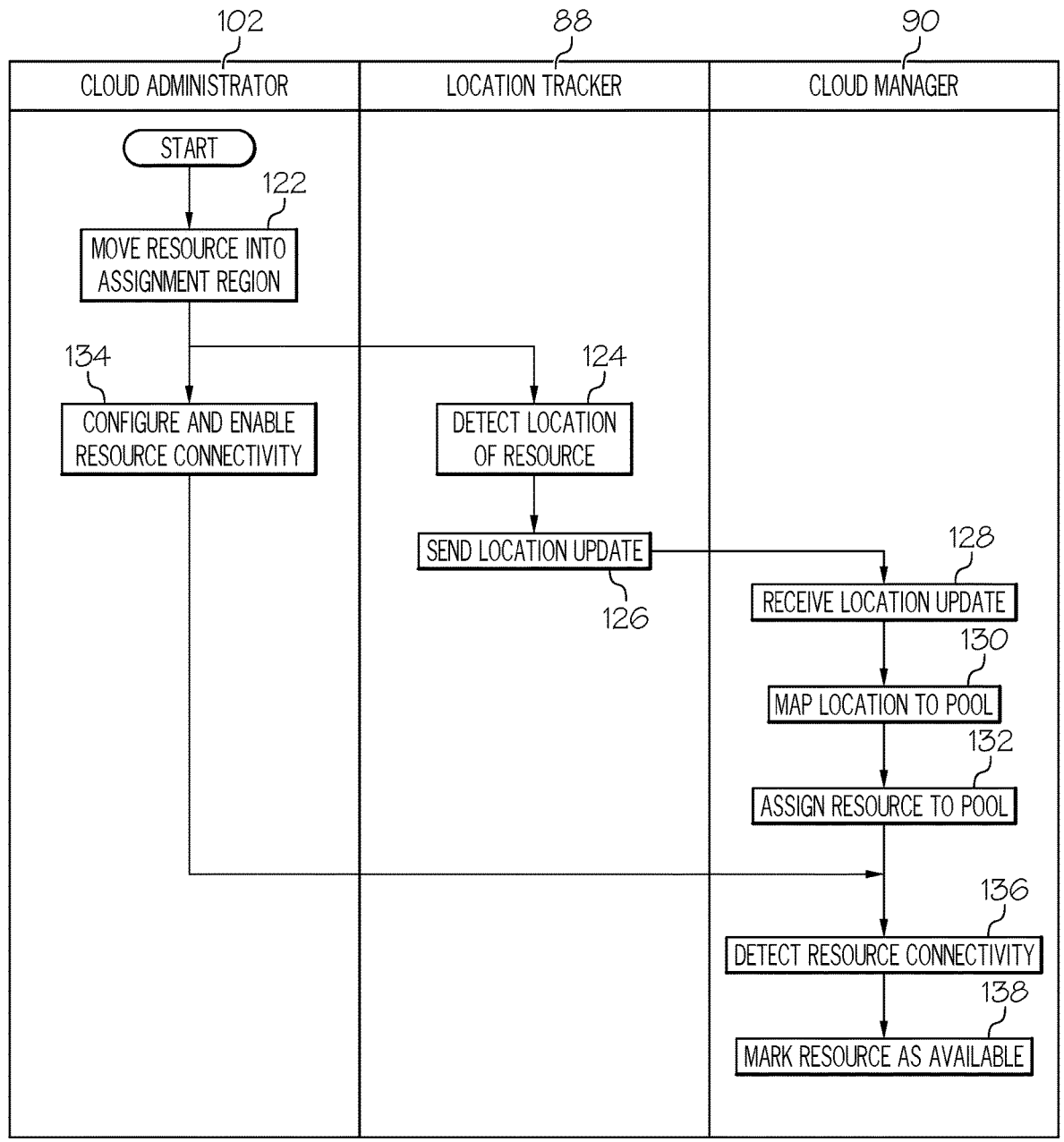
FIG. 6 depicts an example process flow according to an embodiment of the present invention.

Referring now to FIGS. 4 and 6, a basic flow (FIG. 6) for assigning resources to a pool will be shown and described. The flow begins, as shown in FIG. 6, with a Cloud Administrator 102 moving a resource into an assignment region (122), e.g., second region 78. In exemplary embodiments of the invention, resource 74 is a physical server node. Various embodiments may also use a storage resource, such as a storage appliance or disk drawer. First and second regions 76 and 78 are defined in this embodiment as a horizontally defined area of a floor of datacenter 80 extending from the floor to the ceiling. The definition parameters may include a specific set of floor tiles defined in one or both of rule or roster forms (e.g., "A1-A6" or {A1, B2, C6, D3}) and/or a region bounded by spatial coordinates. In an embodiment using the latter method, datacenter 80 would be defined itself as a master region bounded by its corners, and subregions would be defined by grid coordinates within datacenter 80, which may be determined via geolocational metrics (e.g., latitude/longitude) or points on a grid defined relative to datacenter 80 corners/boundaries.

In this embodiment, the previous location (e.g., first region 76) of resource 74 is disregarded. However, when resource 74 has moved into second region 78 and remained within second region 78 for a predetermined period of time (e.g., to filter out transitory cases where a resource crosses one or more regions as it is moved to the eventual target region), location tracker 88 detects the new location (124), determines the region into which resource 74 has been placed, and transmits the destination region (e.g., second region 78) to cloud manager 90 (126).

In one embodiment, the relationship of the geospatial position of resource 74 to a region may be determined asynchronously, e.g., only after resource 74 has ceased to move within datacenter 80 and remained static for the configurable period. In another embodiment, the region may be determined synchronously, meaning that as resource 74 is moved within datacenter 80 its current region is updated constantly. However, the region is not transmitted to cloud manager until it has remained static for the configurable period of time. In one embodiment, "static" for synchronous tracking may be defined as remaining within the same region, even if not in a constant geospatial fixed position within the region. In another embodiment, static for synchronous tracking is defined as remaining at a constant geospatial fixed position. In the case of asynchronous tracking, static refers to a constant geospatial position, since the region is only determined when the resource has been determined to be in a static state, i.e., not being moved physically.

Next, once cloud manager 90 has received the updated location message from location tracker 88 (128), cloud manager 90 maps second region 78 to the associated resource pool (130) and assigns resource 74 to the pool (132). Resource 74 at this point is not actually available for use; it is in a state of 'Assigned-Unavailable.' Cloud admin 102, upon placing resource 74 into the target location, configures resource 74 and enables any required connectivity (134) including, but not limited to, power, network, shared backplane, etc. At the conclusion of this task, resource 74 is assumed to be in a configuration state sufficient for usage by cloud-based workloads. Cloud manager 90 detects resource 74 connectivity (136) and marks resource 74 as 'Assigned-Available' (138). At this point, resource 74 can be used for providing Cloud service instances to service consumers.

It will be appreciated that connectivity detection can be performed in a number of ways. One embodiment uses a simple network management protocol (SNMP) mechanism to detect the presence of resource 74 on an IP network and its fully configured state. Another embodiment assumes the presence of a dedicated agent running on resource 74 (e.g., in the case that server resources are on an IP or other network, which enables application connectivity), wherein the agent communicates the state of resource 74 to cloud manager 90. Yet another embodiment uses a periodic discovery mechanism initiated by cloud manager 90. In the case of periodic discovery, the region-to-pool mapping (or the pool definition) includes the network(s) or other methods of integration to be scanned for the tracked resource.

Figure 7:
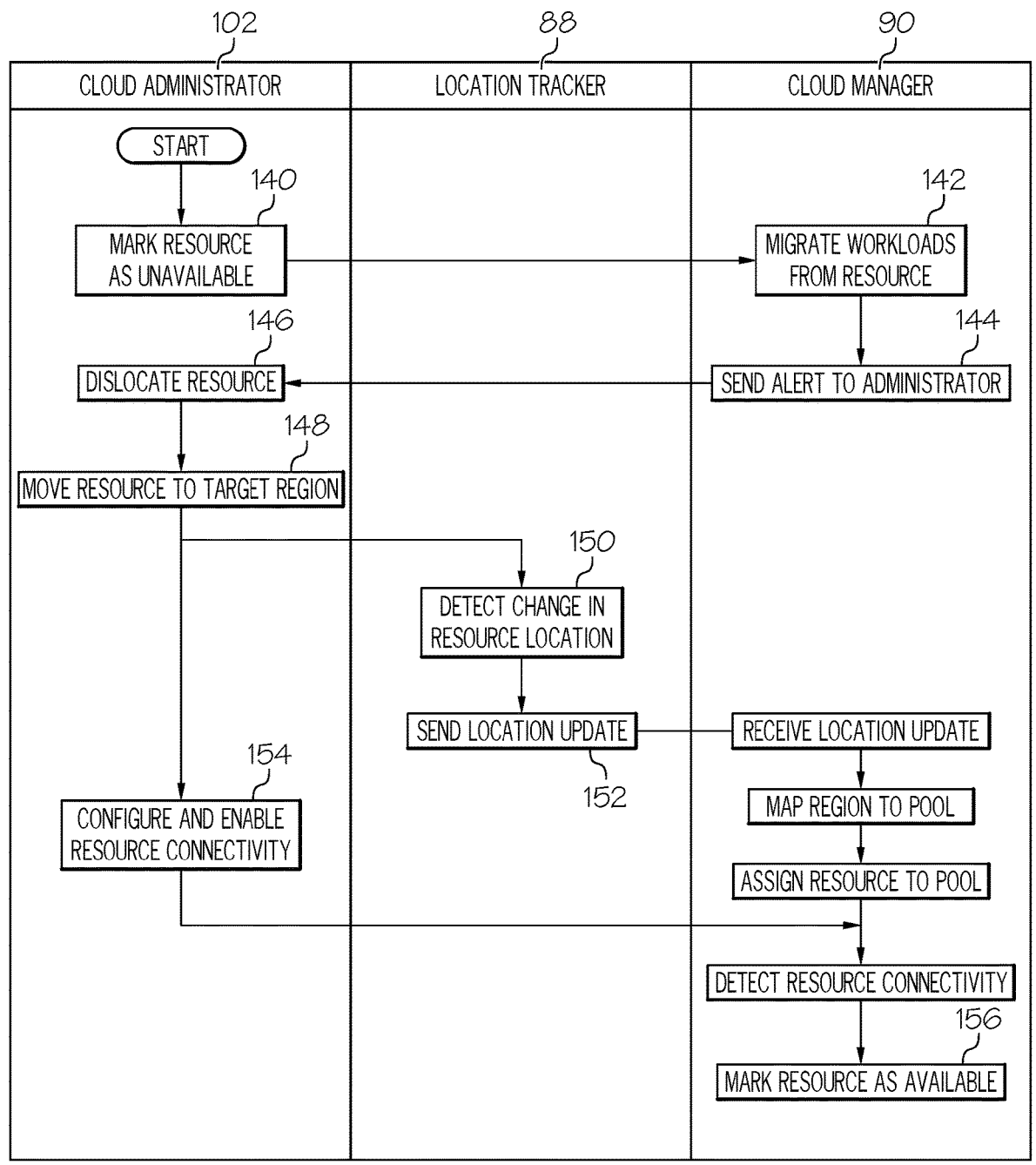
FIG. 7 depicts an example process flow according to an embodiment of the present invention.

Referring now to FIGS. 4 and 7, a process flow (FIG. 7) for moving resources between pools will be shown and described. In this embodiment, resource 74 is reassigned from one pool to another based on a shift in physical location. We assume at the outset of this flow that resource 74 is assigned to pool-A 84 by virtue of being located in first region 76. Resource 74 is in a state of 'Assigned-Available,' which indicates both that resource 74 is assigned to a pool and available for use in provisioning cloud service instances.

The flow starts and cloud Administrator 102 initially marks resource 74 as unavailable (140), which triggers the migration of workloads (cloud service instances) off of resource 74 (142). Cloud manager 90 sends an alert (144) to Cloud Administrator 102 (which may take the form of almost any asynchronous communication, be it an email or an SMS message, or an updating of a GUI display) when pool-A 84 has been rebalanced such that no workloads are dependent on resource 74. The status of resource 74 is changed to 'Assigned-Unavailable' to reflect the resource unavailability for further allocation. Cloud Administrator 102 can then disconnect the resource (146), which may include powering down and decabling, where necessary.

Cloud administrator 102 then moves resource 74 from first region 76 to second region 78 (148). It will be appreciated that resource 74 may traverse other regions en route. As discussed above, in the event that synchronous tracking is being used, a state of rest for resource 74 is identified by resource 74 remaining within the same region for a predetermined (configurable) period of time (150). However, in the case that cloud administrator 102 merely shifts resource 74 from one physical position to another within the same region, this heuristic still applies. Location tracker 88 may, for example, simply timeout and notify cloud manager 90 of the "updated" region (152), which in this case would still be first region 76. Since first region 76 maps to the same pool (i.e., pool A) to which resource 74 is currently assigned, cloud manager 90 can recognize this and simply leave resource 74 in its current state. Once cloud administrator 102 connects/configures resource 74 (154), and resource 74 is placed within the target region, the flow continues as discussed above and shown in FIG. 5. The flow concludes with cloud manager 90 detecting this and updating resource 74 state to 'Assigned-Available' (156).

Figure 8:
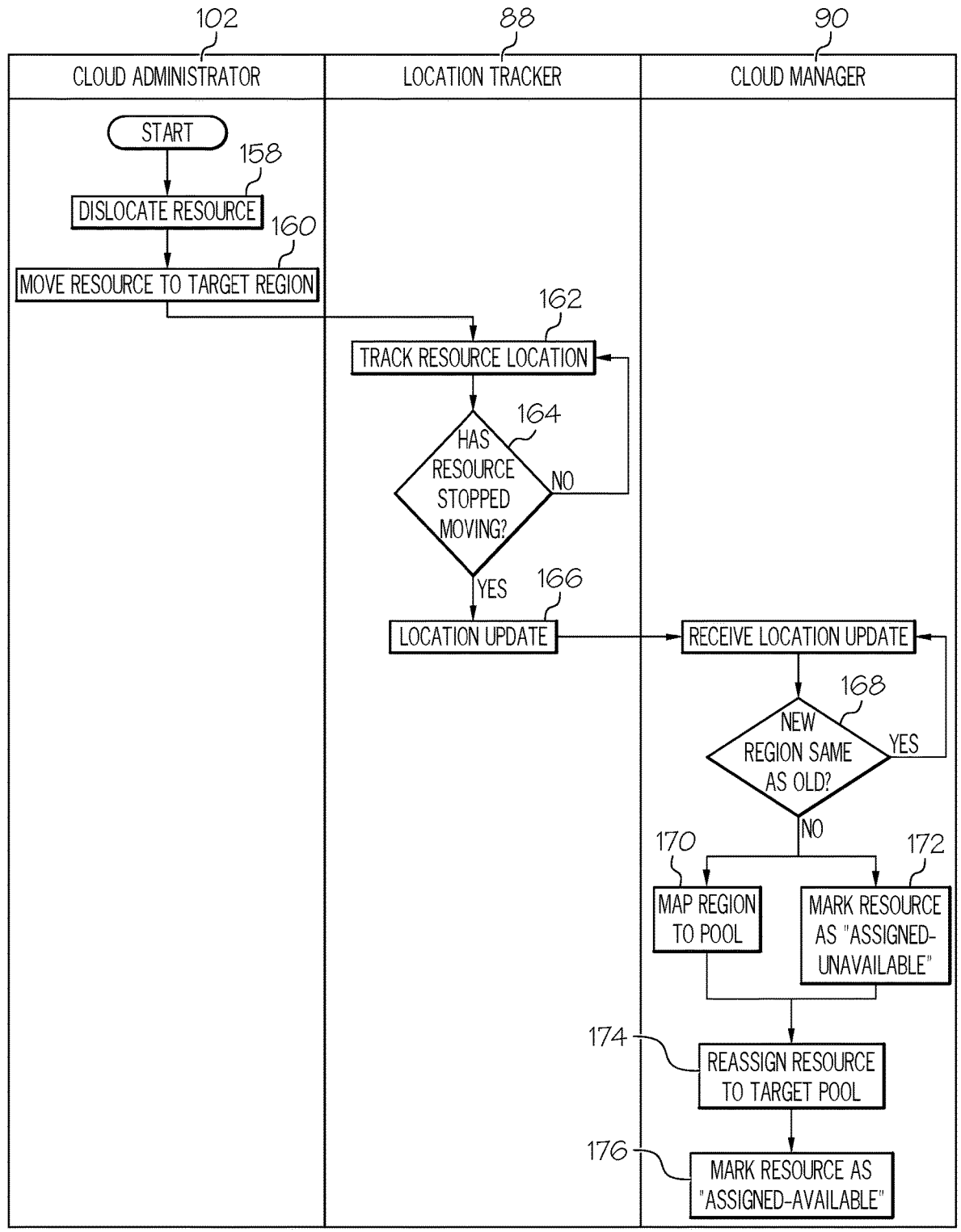
FIG. 8 depicts an example process flow according to an embodiment of the present invention.

Referring now to FIGS. 4 and 8, another process flow (FIG. 8) for moving resources between pools, wherein the location of resource 74 is tracked and determined synchronously, will be shown and described. In this embodiment, the flow starts, and resource 74 is dislocated from its pool (158) and moved to its target region (160). In this embodiment, resource 74 connectivity is uninterrupted during movement, e.g., because resource 74 is a mobile device or laptop with wireless networking and battery power. In this case, resource 74 is able to stay a participating member (i.e., in state 'Assigned-Available') of its original pool (e.g., pool-A 84) until motion ceases, at which time location tracker 88 sends the new location to cloud manager 90.

Location tracker 88 tracks this movement (162), and determines when resource 74 has stopped moving (164). The location of resource 74 is updated (166), and cloud manager 90 then determines if the new region is the same as the old region (168). If it is, cloud manager 90 continues as before without modifying the pool configuration. If the new region is different from the old one (i.e., resource 74 has moved from first region 76 to second region 78), then cloud manager 90 performs two tasks in parallel: it (a) determines the new pool as determined by the region mapping (170); and (b) marks resource 74 as 'Assigned Unavailable' (172). The marking of resource 74 as unavailable is itself a fully synchronous operation which only completes upon all workloads (cloud service instances) having been migrated off of resource 74. Once the status update operation for resource 74 is complete, resource 74 is then moved to the new pool (174), and its status is updated (176), making it available for handling pool workloads (e.g., cloud service instances).

Figure 9:
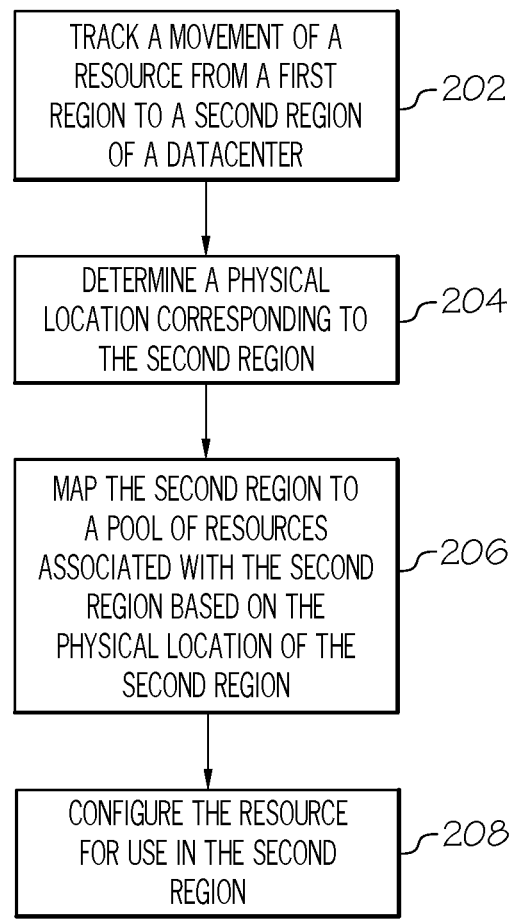
FIG. 9 depicts an example process flow according to an embodiment of the present invention.

Referring now to FIG. 9, a method flow according to an embodiment of the present invention is shown. At 202, a movement of a resource from a first region to a second region of a datacenter is tracked. At 204, a physical location corresponding to the second region is determined. At 206, the second region to a pool of resources associated with the second region based on the physical location of the second region is mapped. At 208, the resource is configured for use in the second region.

The flow of FIG. 9 illustrates the architecture, functionality, and operation of possible implementations of systems, methods, and computer program products according to various embodiments of the present invention. In this regard, each block in the flowchart may represent a module, segment, or portion of code, which comprises one or more executable instructions for implementing the specified logical function(s). It should also be noted that, in some alternative implementations, the functions noted in the blocks might occur out of the order depicted in the figures. For example, two blocks shown in succession may, in fact, be executed substantially concurrently. It will also be noted that each block of flowchart illustration can be implemented by special purpose hardware-based systems that perform the specified functions or acts, or combinations of special purpose hardware and computer instructions.

While shown and described herein as an approach for allocating IT resources in a networked computing environment based on physical location mapping, it is understood that the invention further provides various alternative embodiments. For example, in one embodiment, the invention provides a computer-readable/useable medium that includes computer program code to enable a computer infrastructure to allocate IT resources in a networked computing environment based on physical location mapping, as discussed herein. To this extent, the computer-readable/useable medium includes program code that implements each of the various processes of the invention. It is understood that the terms computer-readable medium or computer-useable medium comprise one or more of any type of physical embodiment of the program code. In particular, the computer-readable/useable medium can comprise program code embodied on one or more portable storage articles of manufacture (e.g., a compact disc, a magnetic disk, a tape, etc.), on one or more data storage portions of a computing device, such as memory 28 (FIG. 1) and/or storage system 34 (FIG. 1) (e.g., a fixed disk, a read-only memory, a random access memory, a cache memory, etc.).

In another embodiment, the invention provides a method that performs the process of the invention on a subscription, advertising, and/or fee basis. That is, a service provider, such as a Solution Integrator, could offer to provide command identification functionality. In this case, the service provider can create, maintain, support, etc., a computer infrastructure, such as computer system 12 (FIG. 1) that performs the processes of the invention for one or more consumers. In return, the service provider can receive payment from the consumer(s) under a subscription and/or fee agreement and/or the service provider can receive payment from the sale of advertising content to one or more third parties.

In still another embodiment, the invention provides a computer-implemented method for allocating IT resources in a networked computing environment based on physical location mapping. In this case, a computer infrastructure, such as computer system 12 (FIG. 1), can be provided and one or more systems for performing the processes of the invention can be obtained (e.g., created, purchased, used, modified, etc.) and deployed to the computer infrastructure. To this extent, the deployment of a system can comprise one or more of: (1) installing program code on a computing device, such as computer system 12 (FIG. 1), from a computer-readable medium; (2) adding one or more computing devices to the computer infrastructure; and (3) incorporating and/or modifying one or more existing systems of the computer infrastructure to enable the computer infrastructure to perform the processes of the invention.

As used herein, it is understood that the terms "program code" and "computer program code" are synonymous and mean any expression, in any language, code, or notation, of a set of instructions intended to cause a computing device having an information processing capability to perform a particular function either directly or after either or both of the following: (a) conversion to another language, code, or notation; and/or (b) reproduction in a different material form. To this extent, program code can be embodied as one or more of: an application/software program, component software/a library of functions, an operating system, a basic device system/driver for a particular computing device, and the like.

A data processing system suitable for storing and/or executing program code can be provided hereunder and can include at least one processor communicatively coupled, directly or indirectly, to memory elements through a system bus. The memory elements can include, but are not limited to, local memory employed during actual execution of the program code, bulk storage, and cache memories that provide temporary storage of at least some program code in order to reduce the number of times code must be retrieved from bulk storage during execution. Input/output and/or other external devices (including, but not limited to, keyboards, displays, pointing devices, etc.) can be coupled to the system either directly or through intervening device controllers.

Network adapters also may be coupled to the system to enable the data processing system to become coupled to other data processing systems, remote printers, storage devices, and/or the like, through any combination of intervening private or public networks. Illustrative network adapters include, but are not limited to, modems, cable modems, and Ethernet cards.

The foregoing description of various aspects of the invention has been presented for purposes of illustration and description. It is not intended to be exhaustive or to limit the invention to the precise form disclosed and, obviously, many modifications and variations are possible. Such modifications and variations that may be apparent to a person skilled in the art are intended to be included within the scope of the invention as defined by the accompanying claims.

What is claimed is:

1. A method for allocating information technology (IT) resources in a networked computing environment based on physical location mapping, the method comprising the computer-implemented steps of:

tracking a physical relocation of a resource, which is a hardware device initially located in a first region and assigned as a virtualized resource of a pool of resources associated with the first region based on being commonly located within a physical area of the first region, from the first region to a second region of a datacenter, wherein the tracking does not require that the hardware device be connected to a network or bus;

determining a physical location corresponding to the second region within a master region having a plurality of regions by mapping a set of spatial coordinates corresponding to the physical location that defines the second region, wherein the set of spatial coordinates define the datacenter as a master region bounded by corners thereof, and define each of the first region and the second region by grid coordinates within the datacenter, which are determined via at least one of geolocational metrics and points on a grid defined relative to the corners of the datacenter;
mapping, in response to an arrival of the hardware device within the set of spatial coordinates defining the second region, the resource of the hardware device to a pool of resources associated with the second region, the pool of resources serving as both a logical container to which the hardware device is assigned and as an abstracted whole from which slices are allocated to cloud service consumers, based on a common location of the pool of resources associated with the second region within the physical location of the second region; and
automatically configuring, in response to an arrival of the hardware device within the set of spatial coordinates defining the second region, the resource for use as a virtualized resource of the pool of resources associated with the second region, wherein the resource is allocated from the pool of resources associated with the first region to the pool of resources associated with the second region without disconnecting the resource from a network.

2. The method of claim 1, the computer-implemented step of configuring further comprising:
enabling a connectivity between the second region and the resource;
detecting the connectivity between the second region and the resource; and
assigning a status identifier to the resource indicating availability of the resource.

3. The method of claim 2, the computer-implemented step of detecting the connectivity comprising at least one of the following: detecting a presence of the resource on an internet protocol network in a fully configured state, receiving a connectivity status from the resource, and periodically checking the connectivity status by a cloud manager.

4. The method of claim 1, the computer implemented step of determining the physical location comprising at least one of the following: detecting a position of a resource tag corresponding to the resource in response to a determination that the hardware device has been static for a predetermined period of time following the physical relocation, and continuously detecting the position of the resource tag corresponding to the resource while the hardware device is in transit during the physical relocation.

5. The method of claim 1, further comprising the computer-implemented step of disconnecting the resource from the pool of resources associated with the first region.

6. The method of claim 5, the disconnecting comprising:
assigning a status identifier to the resource indicating unavailability of the resource; and
migrating a set of cloud service instances of workloads of a pool of resources associated with the first region that are allocated to the resource from the resource.

7. The method of claim 1, the networked computing environment comprising a cloud computing environment within which the datacenter is mapped into a plurality of cloud pools, including the first region and the second region, based on physical location within the master region, wherein the resource and the pool of resources physically located within the set of spatial coordinates corresponding to each region of the plurality of cloud pools processes a specified pool of workloads assigned to the region.

8. A system for allocating information technology (IT) resources in a networked computing environment based on physical location mapping, comprising:
a memory medium comprising instructions;
a bus coupled to the memory medium; and
a processor coupled to the bus that when executing the instructions causes the system to:
track a physical relocation of a resource, which is a hardware device initially located in a first region and assigned as a virtualized resource of a pool of resources associated with the first region based on being commonly located within a physical area of the first region, from the first region to a second region of a datacenter, wherein the tracking does not require that the hardware device be connected to a network or bus;
determine a physical location corresponding to the second region within a master region having a plurality of regions by mapping a set of spatial coordinates corresponding to the physical location that defines the second region, wherein the set of spatial coordinates define the datacenter as a master region bounded by corners thereof, and define each of the first region and the second region by grid coordinates within the datacenter, which are determined via at least one of geolocational metrics and points on a grid defined relative to the corners of the datacenter;
map, in response to an arrival of the hardware device within the set of spatial coordinates defining the second region, the resource of the hardware device to a pool of resources associated with the second region, the pool of resources serving as both a logical container to which the hardware device is assigned and as an abstracted whole from which slices are allocated to cloud service consumers, based on a common location of the pool of resources associated with the second region within the physical location of the second region; and
automatically configure, in response to an arrival of the hardware device within the set of spatial coordinates defining the second region, the resource for use as a virtualized resource of the pool of resources associated with the second region, wherein the resource is allocated from the pool of resources associated with the first region to the pool of resources associated with the second region without disconnecting the resource from a network.

9. The system of claim 8, the instructions causing the system to configure the resource further comprising instructions causing the system to:
enable a connectivity between the second region and the resource;
detect the connectivity between the second region and the resource; and
assign a status identifier to the resource indicating availability of the resource.

10. The system of claim 9, the instructions causing the system to detect the connectivity further comprising at least one of the following: detect a presence of the resource on an internet protocol network in a fully configured state, receive a connectivity status from the resource, and periodically check the connectivity status by a cloud manager.

11. The system of claim 8, the instructions causing the system to determine the physical location comprising at least one of: detect a position of a resource tag corresponding to the resource in response to a determination that the hardware device has been static for a predetermined period of time following the physical relocation, and continuously detect the position of the resource tag corresponding to the resource while the hardware device is in transit during the physical relocation.

12. The system of claim 8, the instructions further causing the system to disconnect the resource from the pool of resources associated with the first region.

13. The system of claim 12, the instructions causing the system to disconnect the resource comprising:
   assign a status identifier to the resource indicating unavailability of the resource; and
   migrate a set of cloud service instances of workloads of a pool of resources associated with the first region that are allocated to the resource from the resource.

14. The system of claim 8, the networked computing environment comprising a cloud computing environment within which the datacenter is mapped into a plurality of cloud pools, including the first region and the second region, based on physical location within the master region, wherein the resource and the pool of resources physically located within the set of spatial coordinates corresponding to each region of the plurality of cloud pools processes a specified pool of workloads assigned to the region.

15. A computer program product for allocating information technology (IT) resources in a cloud computing environment based on physical location mapping, the computer program product comprising a computer readable storage device, and program instructions stored on the computer readable storage device, to:
   track a physical relocation of a resource, which is a hardware device initially located in a first region and assigned as a virtualized resource of a pool of resources associated with the first region based on being commonly located within a physical area of the first region, from the first region to a second region of a datacenter, wherein the tracking does not require that the hardware device be connected to a network or bus;
   determine a physical location corresponding to the second region within a master region having a plurality of regions by mapping a set of spatial coordinates corresponding to the physical location that defines the second region, wherein the set of spatial coordinates define the datacenter as a master region bounded by corners thereof, and define each of the first region and the second region by grid coordinates within the datacenter, which are determined via at least one of geolocational metrics and points on a grid defined relative to the corners of the datacenter;
   map, in response to an arrival of the hardware device within the set of spatial coordinates defining the second region, the resource of the hardware device to a pool of resources associated with the second region, the pool of resources serving as both a logical container to which the hardware device is assigned and as an abstracted whole from which slices are allocated to cloud service consumers, based on a common location of the pool of resources associated with the second region within the physical location of the second region; and
   automatically configure, in response to an arrival of the hardware device within the set of spatial coordinates defining the second region, the resource for use as a virtualized resource of the pool of resources associated with the second region, wherein the resource is allocated from the pool of resources associated with the first region to the pool of resources associated with the second region without disconnecting the resource from a network.

16. The computer program product of claim 15, the program instructions to configure the resource further comprising:
   enable a connectivity between the second region and the resource;
   detect the connectivity between the second region and the resource; and
   assign a status identifier to the resource indicating availability of the resource.

17. The computer program product of claim 16, the program instructions to detect the connectivity further comprising at least one of the following: detect a presence of the resource on an internet protocol network in a fully configured state, receive a connectivity status from the resource, and periodically check the connectivity status by a cloud manager.

18. The computer program product of claim 15, the program instructions to determine the physical location corresponding to the second region comprising at least one of the following: detect a position of a resource tag corresponding to the resource in response to a determination that the hardware device has been static for a predetermined period of time following the physical relocation, and continuously detect the position of the resource tag corresponding to the resource while the hardware device is in transit during the physical relocation.

19. The computer program product of claim 15, further comprising program instructions to disconnect the resource from the pool of resources associated with the first region.

20. The computer program product of claim 19, the instructions to disconnect the resource comprising:
   assign a status identifier to the resource indicating unavailability of the resource; and
   migrate a set of cloud service instances of workloads of a pool of resources associated with the first region that are allocated to the resource from the resource.

* * * * *